June 26, 1956 WEN YUAN PAN ET AL 2,752,486

ULTRA HIGH FREQUENCY OSCILLATION INJECTION EQUALIZER

Filed Oct. 18, 1950 3 Sheets-Sheet 1

INVENTORS
WEN YUAN PAN
& ROBERT D. FLOOD
BY F. J. Harbaugh
ATTORNEY

June 26, 1956 WEN YUAN PAN ET AL 2,752,486
ULTRA HIGH FREQUENCY OSCILLATION INJECTION EQUALIZER
Filed Oct. 18, 1950 3 Sheets-Sheet 2
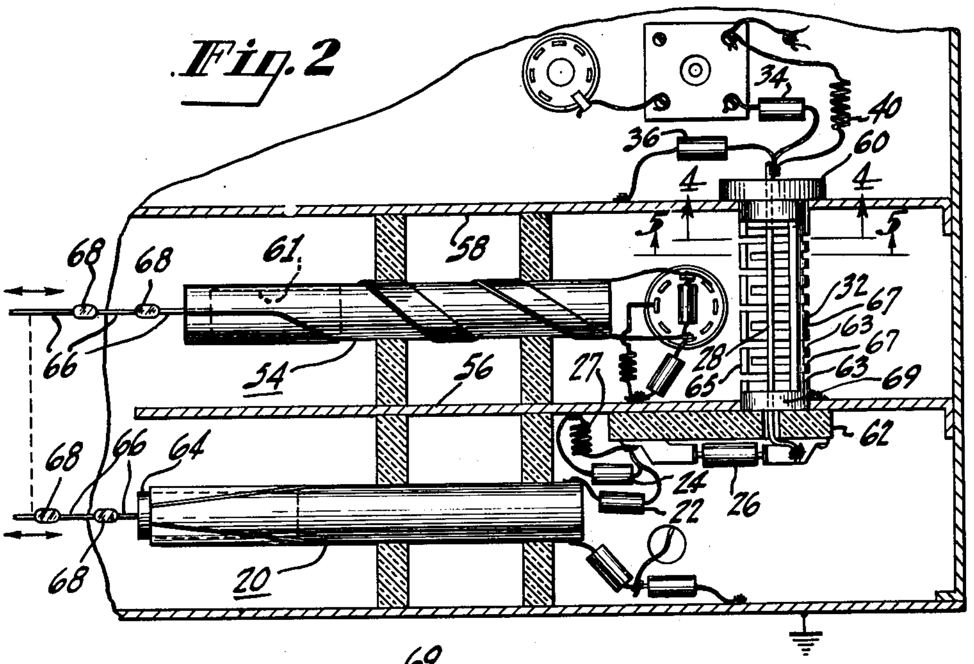
Fig. 2
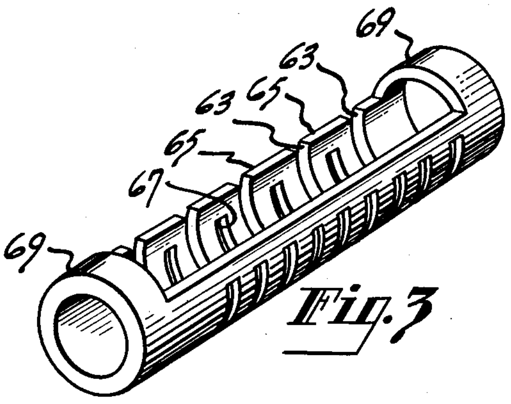
Fig. 3
Fig. 4
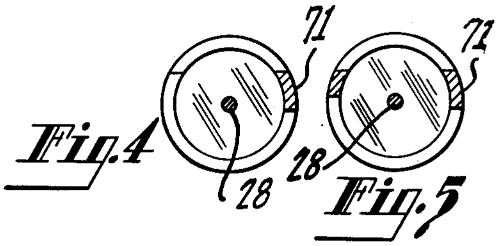
Fig. 5
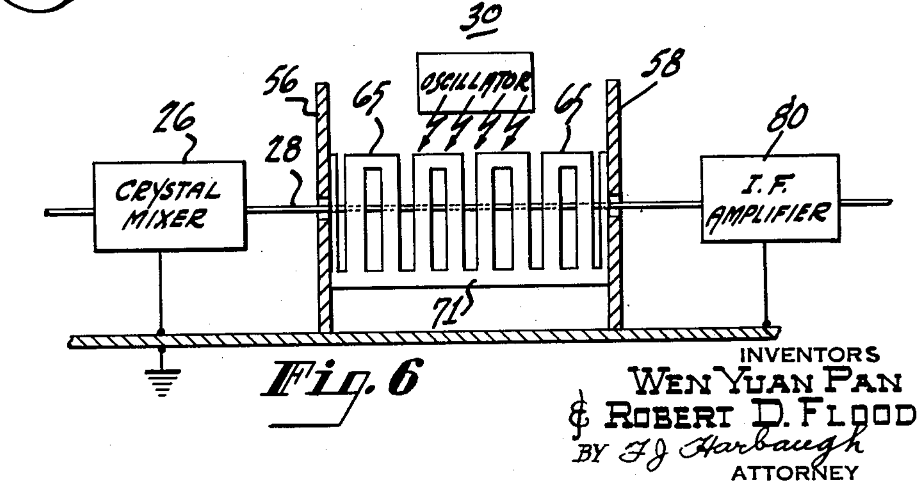
Fig. 6
INVENTORS
WEN YUAN PAN
& ROBERT D. FLOOD
BY F. J. Harbaugh
ATTORNEY

ULTRA HIGH FREQUENCY OSCILLATION INJECTION EQUALIZER

Filed Oct. 18, 1950 3 Sheets-Sheet 3

INVENTORS
WEN YUAN PAN &
ROBERT D. FLOOD
BY F J Harbaugh
ATTORNEY

United States Patent Office 2,752,486
Patented June 26, 1956

2,752,486

ULTRA HIGH FREQUENCY OSCILLATION INJECTION EQUALIZER

Wen Yuan Pan, Collingswood, and Robert D. Flood, Haddonfield, N. J., assignors to Radio Corporation of America, a corporation of Delaware Application October 18, 1950, Serial No. 190,786

The terminal 15 years of the term of the patent to be granted has been disclaimed 7 Claims. (Cl. 250—20)

This invention relates to controllable coupling means between a local oscillator circuit and a mixer circuit. More particularly this invention relates to an oscillator wave injection equalizer for maintaining the oscillator wave power injected into a crystal mixer circuit substantially constant.

The proposed allocation of the frequency spectrum between 500 and 890 megacycles has enabled the assignment of some 65 additional television ultra-high-frequency channels in addition to the 12 presently existing very-high-frequency television channels. Accordingly, existing television receiving systems which have been designed to receive the aforementioned 12 presently allocated television channels are incapable of receiving the radio-frequency carrier waves transmitted on the ultra high frequency channels. Circuit modifications or an additional converter circuit designed to receive the ultra high frequency carrier waves are therefore required to enable reception of the ultra high frequency channels. Such a converter must convert the ultra high frequency carrier wave into a very high frequency carrier wave which can be accepted by a conventional very high frequency television receiver.

The performance requirements of such ultra high frequency converters differ in many respects from those of the very high frequency receivers, due to the fact that the propagation properties of the ultra high frequency waves and the very high frequency waves are different and because the ultra high frequency converter is operated at the much higher frequencies between 500 and 890 megacycles.

An important characteristic of the ultra high frequency converter is its ability to amplify weak signals to a usable level with a satisfactory signal-to-noise ratio. The effective signal-to-noise ratio of a system is generally specified in terms of noise factor which indicates how nearly a receiving apparatus approaches the theoretical minimum of residual noise.

It has been found that a converter utilizing a crystal diode mixer followed by a driven-grounded-grid intermediate frequency amplifier provides a satisfactory noise factor. The noise factor for this circuit is determined primarily by the choice of the intermediate frequency and the performance of the crystal mixer.

The performance of a crystal mixer depends to a great extent on the uniformity of and the amplitude of the oscillator injection. This is due primarly to the fact that the oscillator injection affects the matching between the crystal mixer and the radio frequency and intermediate frequency tuned circuits, the conversion loss, the excess temperature noise of the crystal, and oscillator radiation.

Since the input to the crystal mixer circuit is a carrier wave of ultra high frequency and the output of the crystal mixer circuit is a carrier wave of a lower or intermediate frequency in the very high frequency range, impedance matching between each of the circuits presents a different problem. The crystal mixer circuit, therefore, must be designed to match an input impedance and also to match an output impedance which is different from the input impedance under operating conditions. At a given crystal excitation power, the crystal presents one impedance to the radio-frequency circuit and another impedance to the intermediate-frequency circuit. These radio-frequency and intermediate-frequency impedances of the crystal mixer vary greatly with its excitation power. Such variations, for example, for radio-frequency matching, may produce an impedance variation in excess of 2 to 1 with a variation in crystal current of 0.6 milliamperes. Similarly, the intermediate-frequency impedances may vary by the same ratio in a different range for the same range of crystal current. It, therefore, appears to be obvious that a constant crystal current is highly desirable in order to obtain proper matching at all operating frequencies while maintaining the desired relation between conversion loss and excess temperature noise.

The uniformity and amplitude of oscillator injection are primarily determined by the coupling utilized between the local oscillator and the mixer circuits. In the past, various networks have been proposed to effect this coupling. However, it was found that within the operating frequencies the crystal current variation was in the order of 10 to 1 in tuning over the band. One such network utilized was a conductor energized by the oscillator and brought into proximity with the mixer circuit. However, such a device was found to produce considerable variation in oscillator injection with different frequencies. Another such system utilized a capacitor connected between the oscillator circuit and the mixer circuit to provide the oscillator mixer coupling. This circuit also was found to provide a considerable variation in the coupling with a change in the operating frequency. A third coupling system utilized a transmission line between the mixer and the oscillator. It was found that the change in terminating impedance of the line and other factors with a change in operating frequency gave rise to unsatisfactory results.

Accordingly, it is an object of this invention to provide a new and useful oscillation injection equalizer enabling improved operating efficiency of an associated crystal mixer circuit.

It is a further object of this invention to provide an oscillation injection equalizer enabling substantially constant current amplitude or power for a crystal mixer over a relatively broad band of frequencies.

It is still a further object of this invention to provide an oscillation injection equalizer which is effective as a band-pass filter of broad cut-off characteristics to regulate the amplitude of the injected oscillation wave over a relatively broad band of frequencies.

It is still another object of this invention to provide an oscillation injection equalizer having a shielding characteristic such as to enable substantially constant excitation power in an associated crystal mixer.

It is still another object of this invention to provide an oscillation injection equalizer having characteristics such that the desired relation in an associated crystal mixer circuit between conversion loss and excess temperature noise is maintained over a relatively broad range of frequencies.

It is an ancillary object of this invention to provide an oscillation injection equalizer for preventing currents of deleterious magnitude in an associated crystal mixer circuit.

In accordance with this invention, there is provided an oscillation injection or coupling circuit comprising an inductor or conductor positioned so as to intercept oscillator radiation. There is further provided in combination with the conductor an oscillation injection equalizer which is effective to intercept at least a portion of the oscillator radiated energy and having a variable band-pass characteristic varying directly proportionally with frequency, providing a substantially constant oscillation injection, whereby proper matching and the desired relation between conversion loss and excess temperature noise is maintained at all frequencies.

A better understanding of the invention may be had by reference to the following discussion when read in conjunction with the drawings, in which like reference characters are used throughout for like parts, and in which:

Figure 2 is a segmental view of a portion of the underside of a chassis showing the physical arrangement of that portion of the circuit illustrated in Figure 1, including the radio frequency and oscillator tuned circuits and the oscillator injection equalizer device as provided in accordance with the invention;

Figure 3 is a perspective view of the oscillator injection equalizer as provided in accordance with the invention;

Figure 4 is a view in cross section of the oscillator injection equalizer of Figure 2 taken along line 4—4 of Figure 2 looking in the direction of the arrows;

Figure 5 is a view in cross section of the oscillator injection equalizer of Figure 2 taken along line 5—5 of Figure 2 looking in the direction of the arrows;

Figure 6 is a symbolic representation of the converter illustrated by Figure 1 further showing the characteristics of the oscillator injection equalizer as provided in accordance with the invention;

Figure 8:
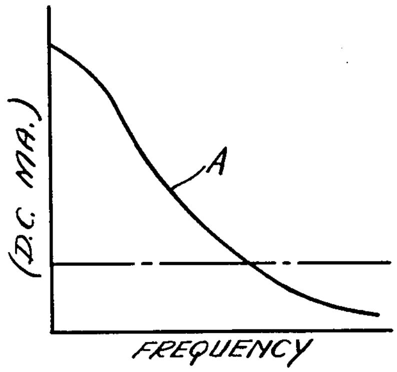
Figure 9:
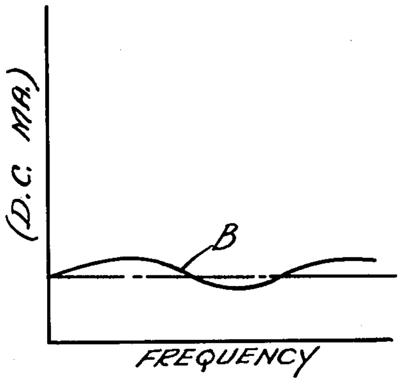

Figure 8 is a graph showing a curve representing the relation between the crystal mixer direct current and frequency when the oscillator injection equalizer provided in accordance with the invention is not utilized; and, Figure 9 is a graph showing a curve representing the relation between the crystal mixer direct-current and frequency when the oscillator injection equalizer provided in accordance with the invention is utilized.

Figure 1:
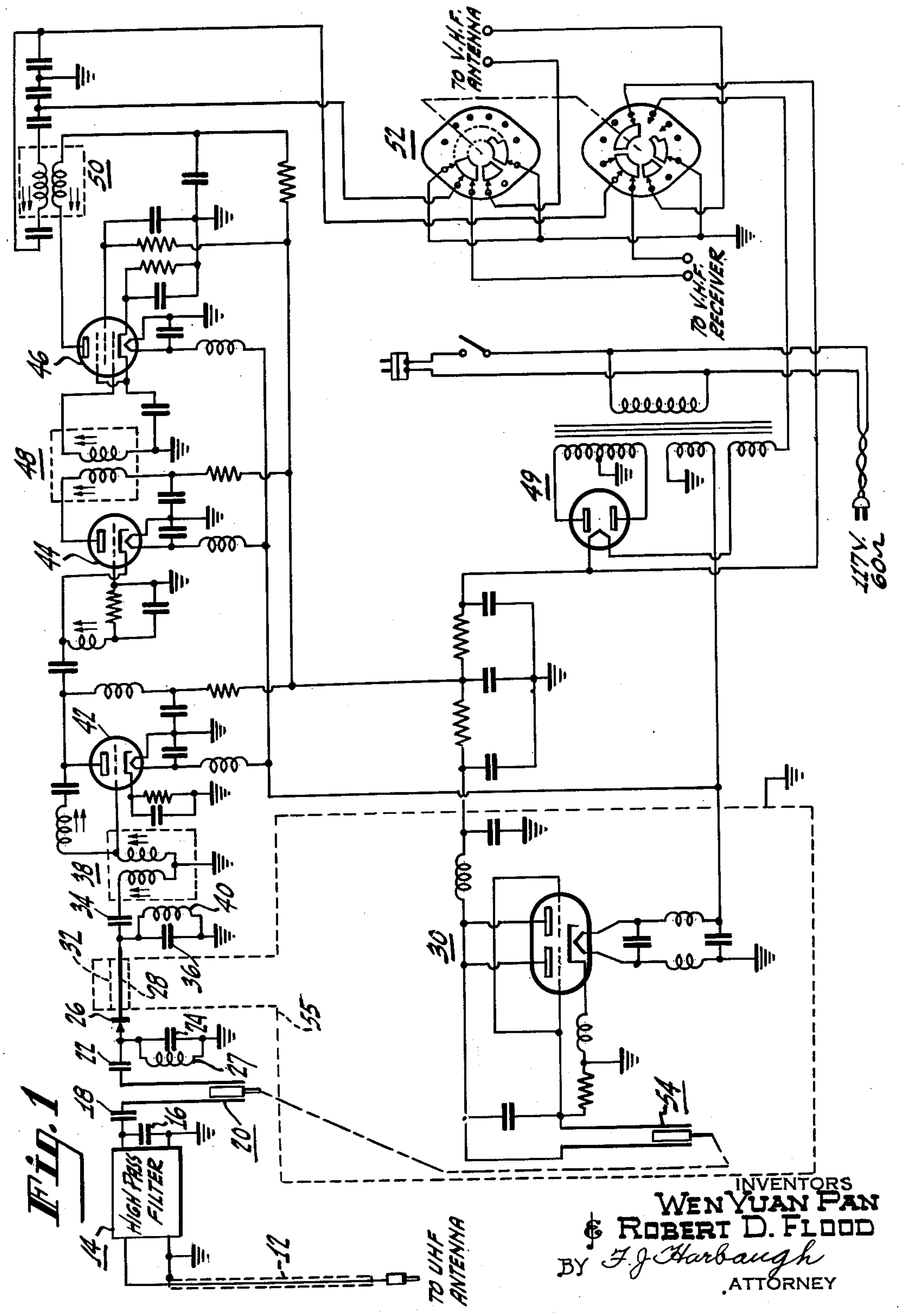
Figure 1 is a schematic circuit diagram of a complete converter circuit utilizing a device provided in accordance with the invention.

Referring now to Figure 1, the transmission line 12 may be connected at one end to an ultra high frequency antenna and connected at the other end to a high-pass filter network 14. Capacitors 16 and 18 provide an impedance transformation network to establish proper impedance matching between the high pass filter circuit 14 and a resonant circuit 20 which is tunable over the ultra high frequency range. The exact functioning and physical embodiment of the tunable circuit 20 is more fully described in a copending application by T. Murakami, Ser. No. 142,012, entitled "Ultra High Frequency Tuning Systems," filed February 2, 1950, now Patent 2,715,211, granted August 9, 1955, and assigned to the assignee of this application. There is coupled to the output of tunable circuit 20 a pair of serially connected capacitors 22 and 24. These capacitors, like the capacitors 16 and 18, provide impedance transformation between the tunable circuit 20 and a crystal diode mixer 26. A choke coil 27, connected in shunt with capacitor 24, is provided to establish a direct-current path for the crystal mixer 26.

There is connected to one electrode, that may be the anode, of the crystal mixer 26 a conductor 28 which serves as the oscillation wave pickup device or coupling circuit between the crystal mixer 26 and the associated oscillator circuit 30. An oscillation injection equalizer 32 partially surrounds the conductor 28, as will be more fully discussed in connection with Figures 2 through 6. The other end of the conductor 28 is connected to impedance transformation capacitors 34 and 36 which are provided to properly match the crystal mixer circuit with the intermediate-frequency transformer 38. There is provided a choke coil 40 which is connected in shunt with the capacitor 36 to complete the direct-current path of the crystal mixer 26.

The intermediate-frequency transformer 38 provides coupling between the mixer circuit and a driven-grounded-grid intermediate-frequency amplifier stage comprising a pair of electron tubes 42 and 44, connected as disclosed by Alexanderson, 1,896,534, February 7, 1933, and Heising, 2,093,078. The electron tube 42 is a grounded-cathode driver stage for the grounded-grid amplifier tube 44. It is noted that these two electron tubes are connected with their signal circuits in series and their energizing circuits in parallel. The grounded-cathode driver 42 and grounded-grid amplifier tube 44 combine to provide a low-noise intermediate-frequency amplifier stage.

The output of this intermediate-frequency amplifier stage is connected to a second intermediate-frequency amplifier tube 46 by means of a tunable transformer 48. The required energizing potential for the various electron tubes of the converter circuit is provided by means of a conventional power supply circuit 49. The output of this second intermediate-frequency amplifier 46 can be connected by means of a third tunable transformer 50 and a switching circuit 52 to the input of a conventional very high frequency television receiving system designated as "VHF Receiver."

The switching circuit 52 has been designed so that its output can be connected to the antenna terminals of a conventional very-high-frequency television receiving system and the input circuit of the switching circuit 52 can be alternately connected to either the output of the second intermediate-frequency amplifier tube 46 or directly to a very-high-frequency receiving antenna, as indicated.

The oscillator circuit 30, which is designed to operate at a frequency below the received ultra-high-frequency carrier wave by an amount equal to the desired intermediate frequency, is tuned by a tunable circuit 54 which also is constructed in accordance with the teachings of T. Murakami as disclosed in the above-mentioned copending application. The tunable circuits 20 and 54 are mechanically coupled so as to provide unicontrol tuning and proper tracking of the two circuits.

Excessive oscillation radiation is prevented by means of a grounded metal shield 55. It is noted at this time that the conductor 28 connected to the crystal diode and the oscillator injection equalizer are both enclosed within a portion of the shield 55. Oscillation energy radiated by the oscillator 30 is thereby confined within the shield and the oscillator coupling circuit comprising conductor 28 and the oscillation injection equalizer 32 are within the confined field of oscillator radiation.

It should be noted at this time that this converter circuit has been designed to operate with an intermediate frequency band from 204 to 216 megacycles. This band was chosen so as to enable the very high frequency television receiver to use either channel twelve or channel thirteen for ultra high frequency reception. The relatively high intermediate frequency makes it possible to obtain high rejection of image and spurious response frequencies and relatively low oscillator radiation with only one ultra-high frequency tuned circuit 20. As the ultra-high frequency carrier waves to be received are within the range of 500 to 700 megacycles, the oscillator is tuned from 290 to 490 megacycles to provide the desired intermediate frequency.

Referring now to Figure 2, there is shown a segmental view of the underside of a chassis illustrating the physical arrangement of various of the components of the converter circuit of Figure 1. In the lower left-hand section of Figure 2, there is shown a physical embodiment of the tunable ultra-high frequency circuit 20. This tunable circuit 20 is connected by means of capacitor 22 to the crystal mixer 26. The parallel arrangement of the capacitor 24 and the choke 27 is illustrated as being connected between the crystal mixer and the chassis which is at ground potential. The other end of the crystal diode 26 is connected to one end of a conductor 28 which passes through a shielded section of the chassis. The shields for isolating this section of the chassis are represented by the partitions 56 and 58. The conductor 28 is insulated from the partitions 56 and 58 by means of insulating blocks 60 and 62 which may be of polystyrene or other low-moss insulating material.

The oscillator injection equalizer 32 is shown as partially surrounding conductor 28 and as being physically connected between the partitions 56 and 58, thereby establishing the ends of the oscillator injection equalizer at the same potential as that of the shield partitions 56 and 58. As illustrated in Figure 1 of the drawings, the tunable oscillator circuit 54 is physically within the shield provided by the partitions 56 and 58, thereby minimizing radiation from the oscillator circuit. The end of the conductor 28 which protrudes beyond the partition 58 and through the insulating block 60 is connected to capacitors 36 and 34. The choke 40 is connected between the protruding end of conductor 28 and ground, thereby completing the direct current circuit for the mixer 26. It is noted that each of the tunable circuits 20 and 54 have conductive cores 61 and 64 respectively, as of copper, which are moved within the tunable circuits by means of Kovar wires 66 connected together by means of properly selected glass beads 68. As above discussed, the Kovar wires are mechanically coupled to provide simultaneous movement of the cores 61 and 64 thereby providing unicontrol tuning of the tunable circuits 20 and 54.

Figure 3 is a perspective view of the oscillation injection equalizer drawn to more fully illustrate the physical characteristics of the injection equalizer as provided in accordance with the invention. It is noted at this time that, though this is a desired configuration, other embodiments could as well be utilized. For example, a flat member having the required electrical characteristics could be partially or completely disposed between the conductor 28 and the oscillator circuit 30 to provide the same function. However, it is believed that the tubular construction herein described more readily adapts itself to ease of adjustment and manufacture. It is readily seen that this cylindrical configuration readily enables rotation of the oscillator-injection equalizer 32 to an angular position with respect to the oscillator to provide the desired amplitude of oscillation injection. Once this adjustment has been made the oscillator-injection equalizer may be mechanically fixed in position as by soldering it to the shield. Of course, if it is desired, a variable adjustment feature can be provided to an easily adjustable coupling.

Figures 4 and 5 are cross-section views of the device illustrated in Figure 2 taken respectively along the lines 4—4 and 5—5 looking in the direction of the arrows. These views further illustrate the configuration of the slotted portions of the oscillator injection equalizer. It is readily seen from an examination of Figures 2 through 5 that the alternate slots 63 in the oscillator injection equalizer 32 completely separate a portion of the tubular member into segmental sections 65 and that the intermediate slots 67 are of a depth sufficient to partially bisect the segmental sections 65 of the tubular member. There is in effect thus provided a device of cylindrical or tubular configuration having a pair of circular end members 69 connected at one point by a continuous element 71 parallel to the axis of the tubular device. The continuous element 71 has interspersed along its length a plurality of U-shaped members 65 formed integrally with the continuous element. This is more fully illustrated by Figure 6.

The schematic diagram of Figure 6, which is partly in block diagram, illustrates a portion of the schematic circuit diagram of Figure 1 and the segmental view of Figure 2. The crystal mixer 26 is illustrated as a block which is connected by means of a conductor 28 to a block 80 designated as an intermediate-frequency amplifier which represents the combined grounded-cathode driver tube 42 and the grounded-grid amplifier tube 44. As shown in Figure 2, conductor 28 passes through a pair of partitions 56 and 58. The oscillator 30 illustrated as a block is shown disposed between the partitions 56 and 58 so as to minimize oscillator radiation. The oscillator injection equalizer is illustrated as comprising a continuous element 71 connected between the partitions 56 and 58, and as above discussed the remaining portions of the oscillator injection equalizer are illustrated as inverted U-shaped sections 65 physically connected with the continuous element 71. In this manner the energy radiated from the oscillator 30 to the conductor 28 is partially shielded from the conductor 28 by means of the oscillator injection equalizer.

Figure 7:
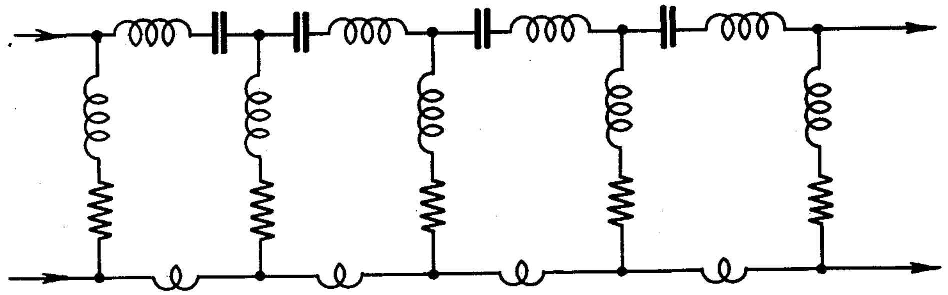
Figure 7 is a schematic circuit diagram representing an equivalent electrical circuit which, if connected between the oscillator circuit and the mixer circuit, would produce the same results as the oscillator injection equalizer provided in accordance with the invention.

The crystal power injection obtained is substantially identical to that which would be obtained if the band-pass network illustrated by Figure 7 were substituted as the coupling device between the oscillator 30 and the crystal mixer 26. It would be apparent to those skilled in the art that a band-pass network of this character can be designed to have a relatively broad band-pass characteristic varying in amplitude with frequency. The effective network as provided by the oscillation-injection equalizer is such as to provide a band-pass characteristic varying directly with frequency having its peak response at a frequency higher than the highest operating frequency of the oscillator circuit. It appears to be obvious that the substitution of a band-pass network as illustrated by Figure 7 would be entirely unfeasible from a practical aspect, and it is therefore readily seen that the oscillator injection equalizer provides, in a simple manner, a highly desirable function.

Referring now to the operation of the converter circuit, an ultra-high frequency carrier wave is received by an antenna and conveyed by means of the 75 ohm coaxial cable 12 to the input of the high-pass filter circuit 14. The output of the high pass filter circuit 14 is attenuated at frequencies below 485 megacycles thereby rejecting all signals in the very high frequency range and enabling reception of frequencies in the ultra high frequency range. The tunable circuit 20 is tuned to the desired ultra high frequency carrier wave. The carrier wave energy thus selected by the tunable circuit 20 from the output of the high pass filter circuit 14 is applied by means of the impedance transformation capacitors to the crystal mixer 26.

Simultaneously with the selecting of the desired ultra high frequency carrier wave, the frequency of the local oscillator 30 is adjusted to a frequency below the ultra high frequency carrier wave equal to the desired intermediate frequency which, in this case, is centered at 210 megacycles.

The output from the oscillator 30 is impressed upon the crystal mixer circuit by virtue of being coupled by means of conductor 28 and the oscillator injection equalizer 32. Mixing of these two carrier wave energies is accomplished due to the nonlinearity of the crystal mixer 26. As is well known in the art, a nonlinear mixing device when subjected to two different frequencies will produce in its output the sum and the difference of the two impressed frequencies. In this instance, the tuned circuit in the output of the crystal mixer 26 is tuned to 210 megacycles, which is the frequency difference of the two impressed waves.

As above discussed, the tuned circuits following the crystal mixer 26 are broadly tuned to have a substantially uniform response characteristic at all frequencies from 204 megacycles to 216 megacycles, thus enabling the use of either channel 12 or channel 13 in the associated very high frequency television receiver. As no city within the United States has been assigned both channels twelve and thirteen of the very high frequency range, there is thus provided an ultra high frequency converter which may be used with existing very high frequency television receiving systems without interfering with any existing broadcast on the very high frequency channels.

As has been previously stated, the performance of a crystal-mixer converter relies to a great extent on the uniformity and the amplitude of oscillator injection. This is due to the fact that the oscillator injection uniformity and amplitude affects the matching in the tuned circuits associated with the crystal mixer. It therefore follows that the impedance of the crystal mixer 26 to the ultra high frequency is going to be different from the impedance of the crystal mixer to carrier waves in the very high frequency range. It has been determined that for an average germanium crystal, such as the General Electric 1N72, the crystal impedance varies from approximately 900 ohms with an excitation power corresponding to a crystal current of 0.2 milliampere to 400 ohms with an excitation power corresponding to a crystal current of 0.8 milliampere. At the same time, the intermediate frequency impedances under these same conditions vary from some 700 ohms to some 300 ohms respectively. Accordingly it is seen that with conventional methods of oscillator coupling, the oscillator injection, and hence the crystal excitation power, may vary over wide limits which would introduce severe losses due to mismatching in the coupled tuned circuits. This has been graphically illustrated in Figure 8 of the drawings wherein curve A represents the excitation current of a crystal mixer when the oscillator and the crystal mixer have been coupled without the use of the oscillator injection equalizer provided in accordance with this invention. It is obvious that in the lower frequency range the excitation current may be sufficient to do actual harm to the crystal structure.

Uniform oscillator injection not only minimizes the impedance mismatch, but it also improves the efficiency of the crystal mixer performance. In general, the loss of a crystal mixer consists of the conversion loss and the loss due to the excess temperature noise. In the frequency-conversion process not all of the available power in the received signal is converted into power at the intermediate frequency. Some power is lost during the conversion process. This conversion loss is high with insufficient oscillator injection, but it becomes practically independent of oscillator injection if more than sufficient excitation power, approximately 500 microwatts, corresponding to a crystal current of approximately 0.5 milliampere, is found to be sufficient oscillator injection.

In addition to the conversion loss, the crystal when driven by a local oscillator generates more noise than the noise produced by an equivalent resistor. This excess temperature noise of a crystal mixer is inversely proportional to the intermediate frequency, but is directly proportional with crystal excitation power. For a given intermediate frequency, there is an optimum level of oscillator injection where the combined conversion loss and the excess temperature noise of the crystal is optimum. It has been determined from measurements that a crystal converter having an intermediate frequency of 210 megacycles and a crystal excitation current of approximately 1 milliampere provides this optimum.

One of the major advantages of a crystal mixer is the possibility of supplying lower excitation power from the local oscillator for efficient mixer operation. A lower excitation power leads to a lower oscillator power being radiated through the converter antenna. Direct chassis radiation depends largely upon the shielding of the oscillator circuit, the oscillator frequency, the type of oscillator circuit and the chassis dimensions. It has been determined that a converter constructed in accordance with the schematic circuit diagram illustrated in Figure 1 of the drawings had an oscillator radiation through the converter antenna well within the proposed limits. As above discussed, the oscillator injection equalizer is in effect a band-pass filter of broad cut-off characteristics. The pass band occurs at frequencies where the amplitude of the normal oscillator injection without the equalizer is at a minimum. In other words, the pass band characteristic of the oscillator-injection equalizer is complementary to the injection characteristic when the oscillator-injection equalizer is not utilized. The result, therefore, is a substantially constant oscillator injection over the entire operating range as illustrated by curve B of the graph shown in Figure 9 of the drawings.

The oscillator injection equalizer also operates as a shield to regulate the amplitude of oscillator injection at all frequencies. By varying the constructional details of the oscillator injection equalizer, the optimum oscillator injection may be obtained without changing its band-pass characteristics. The broad cut-off characteristic is caused by the fact that current is flowing through the slotted elements in both directions. This characteristic is desirable in order to broaden the useful operating range.

It has been determined that in a circuit utilizing the oscillator injection equalizer as provided by the invention, the maximum variation of the input resistance throughout the entire frequency range varies from 510 ohms at the low-frequency end of the spectrum to 380 ohms at the high-frequency end of the spectrum. The corresponding variation in the output resistance was from 330 ohms at the high-frequency end of the spectrum to 150 ohms at the low-frequency end of the spectrum. The excellent improvements over conventional coupling circuits is readily seen if these values are compared with the previously stated values which indicate that without the oscillator injection equalizer a variation in crystal impedance in the order of 5 to 1 or more resulted.

There has thus been provided an oscillator injection-equalizer enabling a greatly improved crystal-mixer converter circuit operation. By virtue of this invention, the oscillator injection can be maintained uniform and adjusted to a desired amplitude over a relatively broad band of operating frequencies. Due to the uniformity and the control of amplitude, matching of the crystal mixer to the associated tuned circuits is greatly simplified. The conversion loss and the excess temperature noise of the crystal per se is maintained at an optimum in operation. Further, oscillator radiation, which would be produced due to mismatch, is maintained at a minimum.

What is claimed is:

1. In an ultra high frequency system, a first source of ultra high frequency currents tunable to different frequencies in a band of ultra high frequencies, a second source of high frequency currents tunable to different frequencies in a different band, a first coupling element coupled between said sources and characterized by a sloping amplitude-frequency characteristic, a second coupling element comprising a shielding member partially surrounding said first coupling element and characterized by an amplitude-frequency characteristic that is complementary to said first-mentioned characteristic, said shielding member being of substantially cylindrical configuration and having a longitudinal axis, a cut-away portion parallel with said axis and a plurality of slots perpendicular to said axis and said second source of high frequency currents, said first coupling element and said second coupling element are disposed within a shield whereby said coupling elements are within the confined field of said source.

2. An ultra high frequency system as defined by claim 1, wherein said shielding member is connected to said shield and said first coupling element is electrically insulated from said shield.

3. In an ultra high frequency superheterodyne circuit, a crystal mixer having a tuned input circuit, a tuned output circuit and a selective coupling circuit, said coupling circuit comprising an inductor and an injection equalizer, said injection equalizer comprising a tubular member partially surrounding said inductor and having a cut-away portion and a plurality of transverse slots, an oscillator coupled with said coupling circuit for supplying local oscillator wave energy thereto, said inductor and said injection equalizer having complementary electrical band-pass characteristics, whereby the amplitude of the oscillator wave energy remains substantially constant over a relatively broad band of operating frequencies.

4. In a high frequency system, a shield enclosure, a coupling element disposed therein, a second coupling element partially surrounding said first element and electrically connected to said enclosure, said second coupling element compriisng a substantially cylindrical member having a longitudinal axis, said member having a cut-away portion parallel to said axis and a first system of slots extending perpendicular to said axis, and one end of each of said slots joining said cut-away portion along one edge thereof, thereby dividing said member into sections connected along the other edge of said cut-away portion.

5. In a high frequency system as defined by claim 4, wherein a second system of slots is provided, each partially bisecting one of said sections.

6. An oscillation-injection equalizer comprising a substantially cylindrical member having a longitudinal axis, said member having a cut-away portion parallel to said axis and a first system of slots extending perpendicular to said axis, one end of each of said slots joining said cut-away portion along one edge thereof, thereby dividing said member into sections connected along the other edge of said cut-away portion.

7. An oscillation injection equalizer comprising a substantially cylindrical member having a pair of circular end rings and a longtiudinal axis, said member having a cut-away portion parallel to said axis and a first system of slots extending perpendicular to said axis, one end of each of said slots joining said cut-away portion along one edge thereof, thereby dividing said member into sections connected along the other edge of said cut-away portion, said member also having a second system of slots, each partially bisecting one of said sections.

References Cited in the file of this patent

UNITED STATES PATENTS

| | | |
|---|---|---|
| 1,502,063 | Schottky | July 22, 1924 |
| 2,312,687 | Curtis | Mar. 2, 1943 |
| 2,380,333 | Scheldorf | July 10, 1945 |
| 2,388,049 | Goode | Oct. 30, 1945 |
| 2,455,657 | Cork | Dec. 7, 1948 |
| 2,457,008 | Sziklai | Dec. 21, 1948 |
| 2,501,093 | Raymond | Mar. 21, 1950 |
| 2,550,689 | Gustafson | May 1, 1951 |
| 2,567,208 | Horvath | Sept. 11, 1951 |
| 2,576,979 | Thompson | Dec. 4, 1951 |
| 2,594,167 | Herold | Apr. 22, 1952 |
| 2,605,399 | Pound | July 29, 1952 |
| 2,605,400 | McClain | July 29, 1952 |
| 2,653,228 | Pan | Sept. 22, 1953 |
| 2,705,305 | Bailey | Mar. 29, 1955 |